(12) United States Patent
Shaposhnikov

(10) Patent No.: US 10,872,519 B2
(45) Date of Patent: Dec. 22, 2020

(54) SCHOOL EMERGENCY NOTIFICATION SYSTEM AND METHOD

(71) Applicant: FrandMe, Inc., Aventura, FL (US)

(72) Inventor: Dimitry Shaposhnikov, Hallandale, FL (US)

(73) Assignee: FRANDME, INC., Aventura, FL (US)

( * ) Notice: Subject to any disclaimer, the term of this patent is extended or adjusted under 35 U.S.C. 154(b) by 0 days.

(21) Appl. No.: 16/418,443

(22) Filed: May 21, 2019

(65) Prior Publication Data

US 2019/0355236 A1    Nov. 21, 2019

Related U.S. Application Data

(60) Provisional application No. 62/756,580, filed on Nov. 6, 2018, provisional application No. 62/674,552, filed on May 21, 2018.

(51) Int. Cl.
| | | |
|---|---|---|
| *G08B 21/02* | (2006.01) | |
| *G08B 27/00* | (2006.01) | |
| *H04W 4/029* | (2018.01) | |
| *H04W 4/90* | (2018.01) | |

(52) U.S. Cl.
CPC ........ *G08B 27/001* (2013.01); *G08B 27/005* (2013.01); *G08B 27/006* (2013.01); *H04W 4/029* (2018.02); *H04W 4/90* (2018.02)

(58) Field of Classification Search
CPC ...... G06Q 10/00; G06Q 10/107; G06Q 50/01; G06Q 50/20; G06Q 50/265; G08B 27/008; H04L 12/1845; H04L 12/189; H04L 12/1895; H04L 51/02; H04M 2201/60; H04M 2203/658; H04M 2207/18; H04M 3/5307; H04W 4/90
USPC ........ 340/539.13, 539.15, 539.2, 571, 572.1, 340/573.3, 641, 3.1, 825.28, 5.51
See application file for complete search history.

(56) References Cited

U.S. PATENT DOCUMENTS

| | | | |
|---|---|---|---|
| 6,226,260 B1 * | 5/2001 | McDysan | H04L 12/4608 370/216 |
| 9,501,803 B2 * | 11/2016 | Bilac | H02J 12/001 |
| 9,965,936 B1 * | 5/2018 | Epps | G08B 21/02 |
| 2001/0033639 A1 * | 10/2001 | Martin | H04M 3/5307 379/88.14 |

(Continued)

*Primary Examiner* — Daniel Previl
(74) *Attorney, Agent, or Firm* — Mark C. Johnson; Johnson Dalal

(57) ABSTRACT

A web-based school emergency notification system and method allows a first teacher user, a first student user, a first administrator user, a first relative user, and an emergency response user to effectively communicate in real time during an emergency event. The system and method are operable on a mobile communication device carried by each user, and through a downloadable EN mobile software application. The software application is communicatively coupled to at least one server over a selectively closed network, allowing the users to send messages in real time. The software application communicatively links the mobile communication devices to a global positioning system. The global positioning system tracks the geolocation of the teacher user and student user at the school. The users can also input a specific location for tracking with the GPS. The users can also message each other in real time during the emergency event to coordinate a response.

17 Claims, 12 Drawing Sheets

(56) References Cited

U.S. PATENT DOCUMENTS

| | | | |
|---|---|---|---|
| 2005/0192822 A1* | 9/2005 | Hartenstein | G06Q 10/109 705/319 |
| 2006/0109113 A1* | 5/2006 | Reyes | G08B 25/085 340/541 |
| 2010/0162364 A1* | 6/2010 | Roth | G06F 21/604 726/4 |
| 2011/0095881 A1* | 4/2011 | Rosentel | G08B 27/008 340/501 |
| 2013/0346333 A1* | 12/2013 | Hassler | G06Q 10/107 705/325 |
| 2017/0324694 A1* | 11/2017 | Islam | H04L 51/046 |

* cited by examiner

300

800

SCHOOL EMERGENCY NOTIFICATION SYSTEM AND METHOD

CROSS-REFERENCE TO RELATED APPLICATION

This application claims priority to U.S. Provisional Patent Application No. 62/756,580, filed Nov. 6, 2018, and U.S. Provisional Patent Application No. 62/674,552, filed May 21, 2018 the entirety of both are incorporated by reference.

FIELD OF THE INVENTION

The present invention relates generally to school emergency notification systems and methods, and, more particularly, relates to a web-based emergency notification system and method that allows students, teachers, administrators, relatives, and emergency response users to effectively communicate an emergency event send messages in real time, and for emergency response users to view the geolocation of teachers and students, so as to achieve a timely response.

BACKGROUND OF THE INVENTION

Typically, schools and the associated staff, students, parents, and local emergency response units are in total confusion during an emergency event, such has a school shooting, inclement weather, flood, and power outage. The school, and administrators in charge, are required to contact the relatives of the students during such an emergency event. However, this is also the time that communication lines are full, and time is scarce for communications with off-campus parents. The administrators are sufficiently busy trying to assess the emergency event and contact the appropriate emergency response units.

Often, identifying the exact location of the teachers and students trapped in the school during the emergency event is problematic. The emergency response units may simply roam the school audibly calling out instructions, or randomly calling the teachers and students to evacuate at a specific location of the school. Also, it is often a "hero" that has to assume the responsibilities of neutralizing the emergency event and evacuating/protecting the student and teachers. This is on-and-off; and further is inefficient when dealing with a large school having thousands of students.

Therefore, a need exists to overcome the problems with the prior art as discussed above.

SUMMARY OF THE INVENTION

The invention provides a web-based school emergency notification system and method that overcomes the hereinafore-mentioned disadvantages of the heretofore-known devices and methods of this general type and that allows a first teacher user, a first student user, a first administrator user, a first relative user, and an emergency response user to effectively communicate in real time through an emergency event. The system and method are operable on a mobile communication device carried by each user, and through a downloadable EN mobile software application. The software application is communicatively coupled to the at least one server over a selectively closed network, allowing the users to send messages in real time; and further enabling the emergency response user to view the geolocation of the teacher user and student user, so as to achieve a timely response to the emergency event.

With the foregoing and other objects in view, there is provided, in accordance with the invention, a computer-implemented emergency notification (EN) method implemented in an education facility environment. The method includes an initial Step of providing, at least one server, at least one database storing a first teacher user account of a first teacher user and a first student user account of a first student user logically and selectively hierarchically diminutively associated with the first teacher user account, wherein the first teacher user account is part of a plurality of teacher user accounts resident on the at least one database and the first student user account is part of a plurality of student user accounts resident on the at least one database that are operably configured to be selectively hierarchically diminutively associated with the first teacher user account.

Another Step may include downloading, by a mobile communications device of the first teacher user and a mobile communications device the first student user, an EN mobile software application communicatively coupled to the at least one server over a selectively closed network, the mobile communications devices of the first teacher and student users having an electronic display operably configured to receive user inputs and the EN software application operably configured to cause a user interface to display on the electronic display of the mobile communications devices of the first teacher and student users with a code red icon and a code yellow icon both display on the user interfaces Yet another Step comprises receiving, at the at least one server, a first emergency notification generated from activation, on the user interface of the mobile communications devices of at least one of the first teacher user and the first student user, of at least one of the code red icon and the code yellow icon of an emergency event.

The method also provides a Step of distributing, from the at least one server and over the selectively closed network, an emergency alert for display on the user interfaces of the electronic communication devices and to an emergency response user associated with the plurality of teacher user accounts and the plurality of student user accounts.

In accordance with another feature, an embodiment of the present invention includes a Step of, after receiving the first emergency notification, autonomously initiating a communication protocol with the emergency response user, the communication protocol including relaying indication of the emergency event to the emergency response user.

In accordance with a further feature of the present invention, the emergency response user includes at least one of the following: a medical professional, an ambulance unit, a law enforcement officer, a fireman, a hazardous material clean-up unit.

In accordance with a further feature of the present invention, a Step includes providing, at the at least one server, the least one database storing a first administrator user account of a first administrator user, wherein the first teacher user account of the first teacher user and the first student user account of the first student user are both logically and selectively hierarchically diminutively associated with the first administrator user account of the first administrator user.

In accordance with a further feature of the present invention, the plurality of teacher user accounts and the plurality of student user accounts are operably configured to be selectively hierarchically diminutively associated with the first administrator user account.

In accordance with a further feature of the present invention, the first administrator user is a school administrator, a principle, and a vice principle.

In accordance with yet another feature, an embodiment of the present invention includes a Step of providing, at the at least one server, the least one database storing a first relative user account of a first relative user, wherein the first teacher user account of the first teacher user, the first student user account of the first student user, and the first administrator user account of the first administrator user are logically associated with the first relative user account of the first relative user.

In accordance with yet another feature, an embodiment of the present invention includes a Step of after receiving the emergency alert, initiating at least one message between the users.

In accordance with yet another feature, an embodiment of the present invention includes a Step of after receiving the emergency alert, initiating the at least one message between the first administrator user, the first teacher user, the first student user, the emergency response user, and the first relative user through the at least one server.

In accordance with a further feature of the present invention, first relative user includes at least one of the following: a parent, a brother, a sister, a grandparent, an uncle, and a legal guardian.

In accordance with yet another feature, an embodiment of the present invention includes a Step of communicatively linking the mobile communication devices of the first teacher user and the first student user with a global positioning system, the global positioning system tracking the geolocation of the first teacher user and the first student user.

In accordance with yet another feature, an embodiment of the present invention includes a Step of communicatively linking the mobile communication devices of the first teacher user and the first student user with the global positioning system, the global positioning system tracking the geolocation of the first teacher user and the first student user upon activation of the first emergency notification generated on the user interface of the mobile communications devices.

In accordance with yet another feature, an embodiment of the present invention includes a Step of representing the geolocation of the first teacher user and the first student user on a digital map, the digital map being viewable by the emergency response user.

In accordance with yet another feature, an embodiment of the present invention includes a Step of inputting by the first teacher user and the first student user a specific location on the user interface of the mobile communications devices of at least one of the first teacher user and the first student user in response to the emergency event.

In accordance with yet another feature, an embodiment of the present invention includes a Step of representing the specific location of the first teacher user and the first student user on the digital map.

In accordance with yet another feature, an embodiment of the present invention includes a Step of causing, by the EN software application, the user interface to display on the electronic display of the mobile communications devices of the first teacher and student users a code green icon.

In accordance with a further feature of the present invention, the code red icon, the code yellow icon, and the code green icon inconspicuously display proximal to an upper portion of a first page of the user interfaces.

In accordance with a further feature of the present invention, the code red icon, the code yellow icon, and the code green icon display with a time stamp on the first page of the user interfaces.

Although the invention is illustrated and described herein as embodied in a school emergency notification system and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/ dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DESCRIPTION OF THE INVENTION

Figure 1:
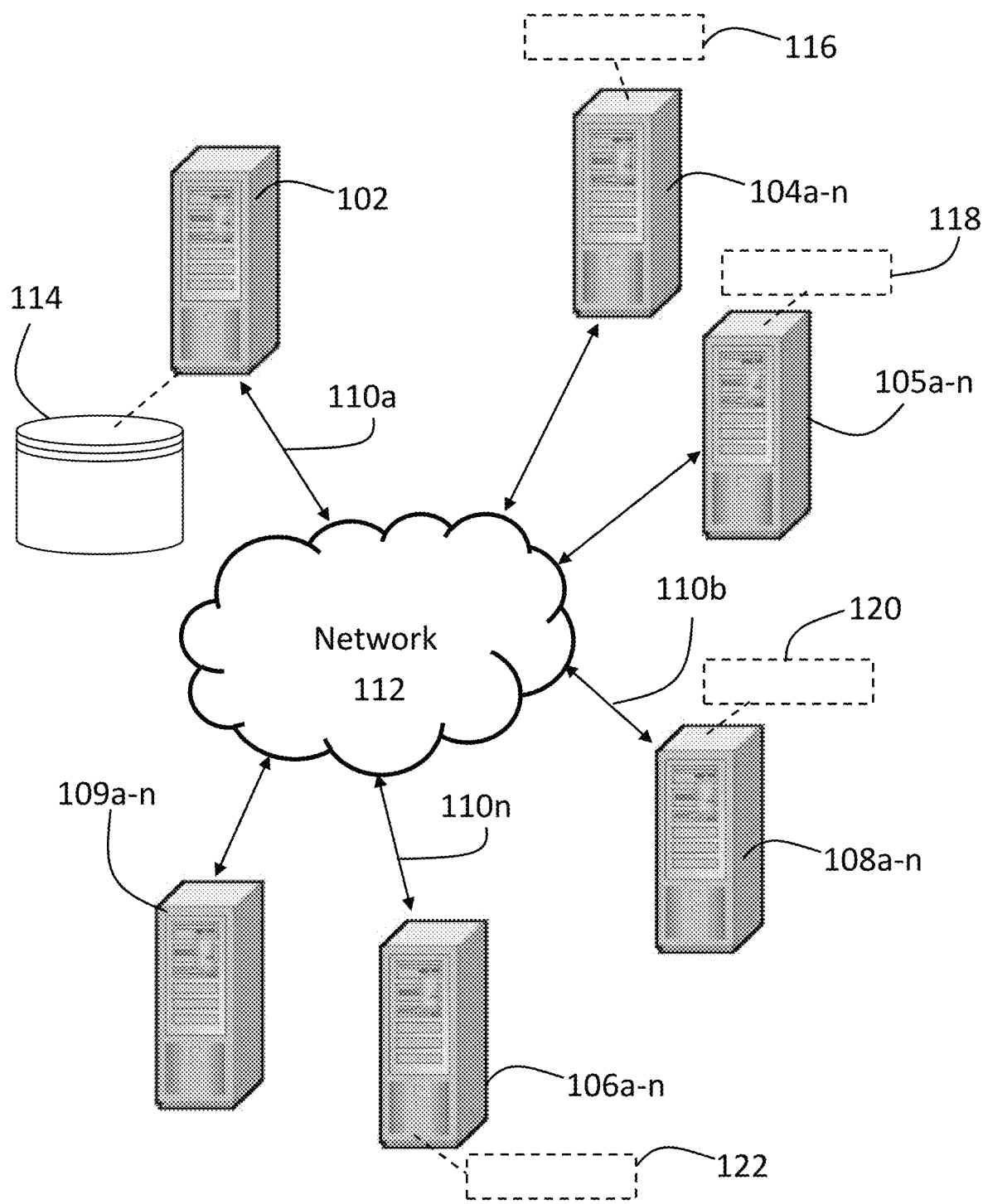
FIG. 1 is a block diagram showing the communication links in a closed network, and the links between different users and user accounts with a central server and database holding information about the users, in accordance with the present invention.

The invention provides a school networking and emergency notification system and method that overcomes the hereinafore-mentioned disadvantages of the heretofore-known devices and methods of this general type. With the foregoing and other objects in view, there is provided, in accordance with the invention, a computer-implemented school networking and emergency notification system and method.

Although the invention is illustrated and described herein as embodied in a school networking and emergency notification system and method, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

While the specification concludes with exemplary claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient school networking and emergency notification system and method. Specifically, the system and method may be operated over a network 100 includes connections 110a-n, which are the medium used to provide communications links between various devices and computers connected together within the system 100. The connections 110a-n may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

In the depicted example, the network 112 can include the Internet, which represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network 112 also may be implemented as a number of different types of networks, such as for example, an Intranet, a local area network (LAN), or a wide area network (WAN). FIG. 1 is intended as an example, and not as an architectural limitation for the present invention. FIG. 1 is a block diagram showing the communication links in a closed network, and the links between different users and user accounts with a central server and database holding information about the users. The system 100 and/or the network 112 may include additional servers and other devices and entities not shown.

In one embodiment, the system 100 permits users to create a channel, via a single user-friendly interface, as will be described herein below in more detail. Embodiments of the system 100 are configured such that a single input into the editing application interface may apply to an associated channel. As such, the system 100 is operably configured to associate a user's channel, e.g., a school, with "sub-channel" member(s), e.g., teachers, whereby any sub-channel member may associate one or more third-party member(s), e.g., students, with said sub-channel. Updates on a channel owner's page may then automatically notify sub-channel member(s) and/or third-party member(s).

Figure 2:
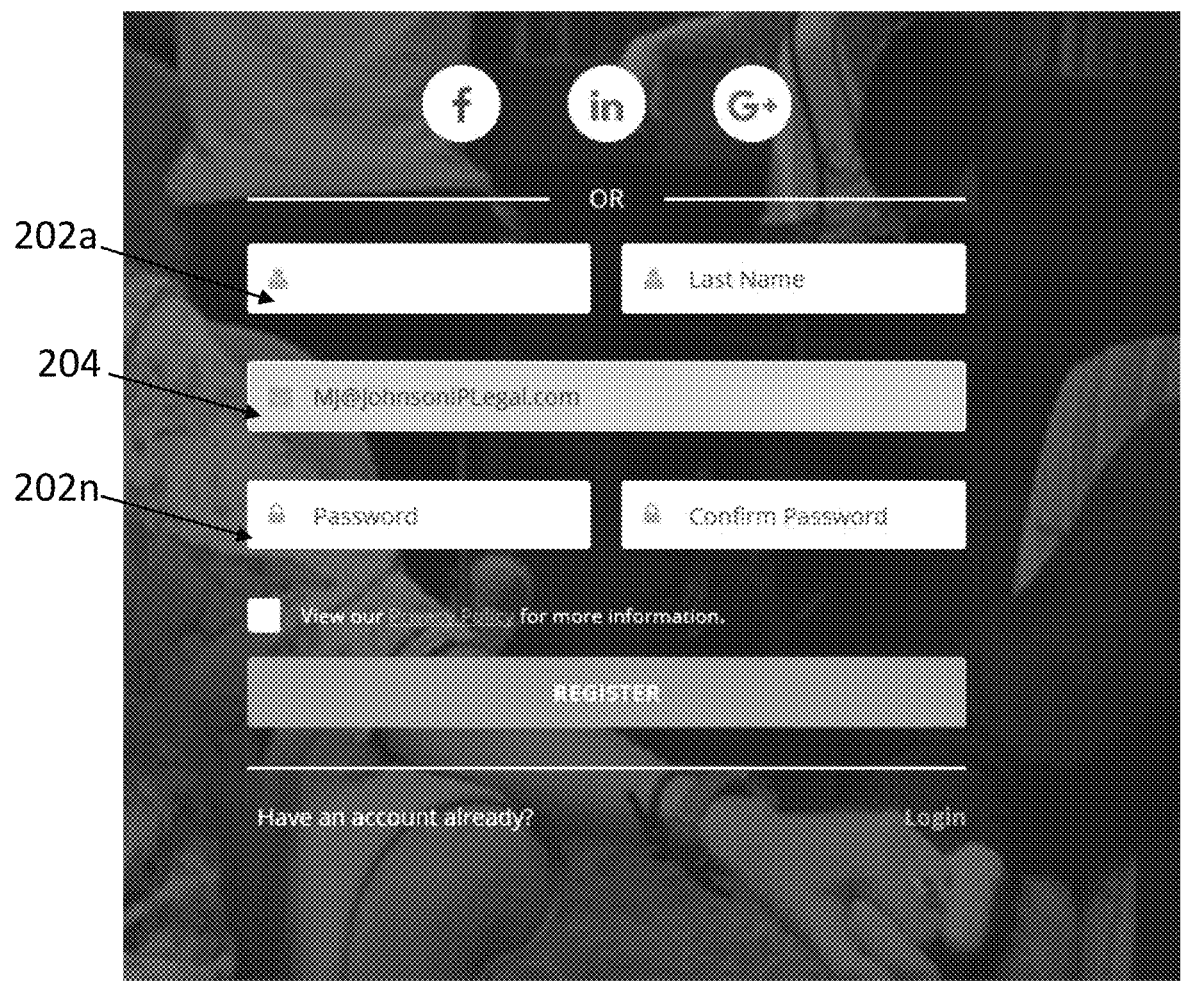
FIG. 2 is an exemplary screen shot 200 of a sub-channel member registering under the channel owner's account, in accordance with the present invention.

An exemplary screen shot 200 of a sub-channel member registering under the channel owner's account, wherein the email associated with the link sent from the channel owner can be seen in FIG. 2. Said another way, each school may simultaneously send updates and notifications to both sub-channel members and third-party members through, for example, an invitation to a sub-channel member, wherein the sub-channel member's email is pre-populated into the sub-channel member invitation field 202 to associate it with the user's channel.

As such, a computer-implemented method for notifying persons and/or entities of an emergency event is disclosed and may include, from an abstract level, an administrative server 102 where user accounts are housed and where information and data may be received at or communicated from, one or more administrator users 104*a-n*, wherein "n" represents any number greater than 1, one or more teacher users 106*a-n*, one or more student users 108*a-n*, one or more relative users 105*a-n*, and one or more emergency response users 109*a-n*. Note that while FIG. 1 visually depicts a desktop as the users, it may be any computing devices, e.g., a mobile phone, tablet, etc., with network communication capability associated with a user.

While the users are represented in FIG. 1 as servers or computers, those of skill in the art will appreciate that any computing device may suffice to carry out the process of the present invention. Specifically, the process may begin with providing, at the at least one server, e.g., server 102, at least one database 114 storing a first administrator user account 116 of a first administrator user 104*a*. The database 114 also stores a first teacher user account 122 of a first teacher user 106*a* that is logically and selectively hierarchically diminutively associated with the first administrator user account.

Said another way, the teacher user account 122 is logically associated with the first administrator user account 116 through, for example, an array based on computer logic. The teacher user account 122 is selectively hierarchically diminutively associated with the first administrator user account 116 in that the administrator user may select which teachers are to be associated with the administrator user account and that the teacher user will only have certain permissions (based on the school's discretion) to modify, add, delete, receive, and/or communicate certain information or data to other users. The database 114 also stores a first relative user account 118 of the first relative user 105*a*.

A first student user account 120 of a first student user 108*a* may also be logically and selectively hierarchically diminutively associated with the first administrator user account 116. Said another way, the student user account 120 is logically associated with the first teacher user account 122 through, for example, an array based on computer logic. The student user account 120 is selectively hierarchically diminutively associated with the first administrator user account in that the teacher user may select which students are to be associated with the teacher user account and that the student user will only have certain permissions (based on the teacher's discretion) to modify, add, delete, receive, and/or communicate certain information or data to other users.

The first teacher user account 122 of the plurality of teacher user accounts is operably configured to be selectively hierarchically diminutively associated with the first administrator user account and the first student user account of a plurality of student user accounts operably are configured to be selectively hierarchically diminutively associated with the first teacher user account, with the above-described limitations, restrictions, and/or permissions.

Figure 3:
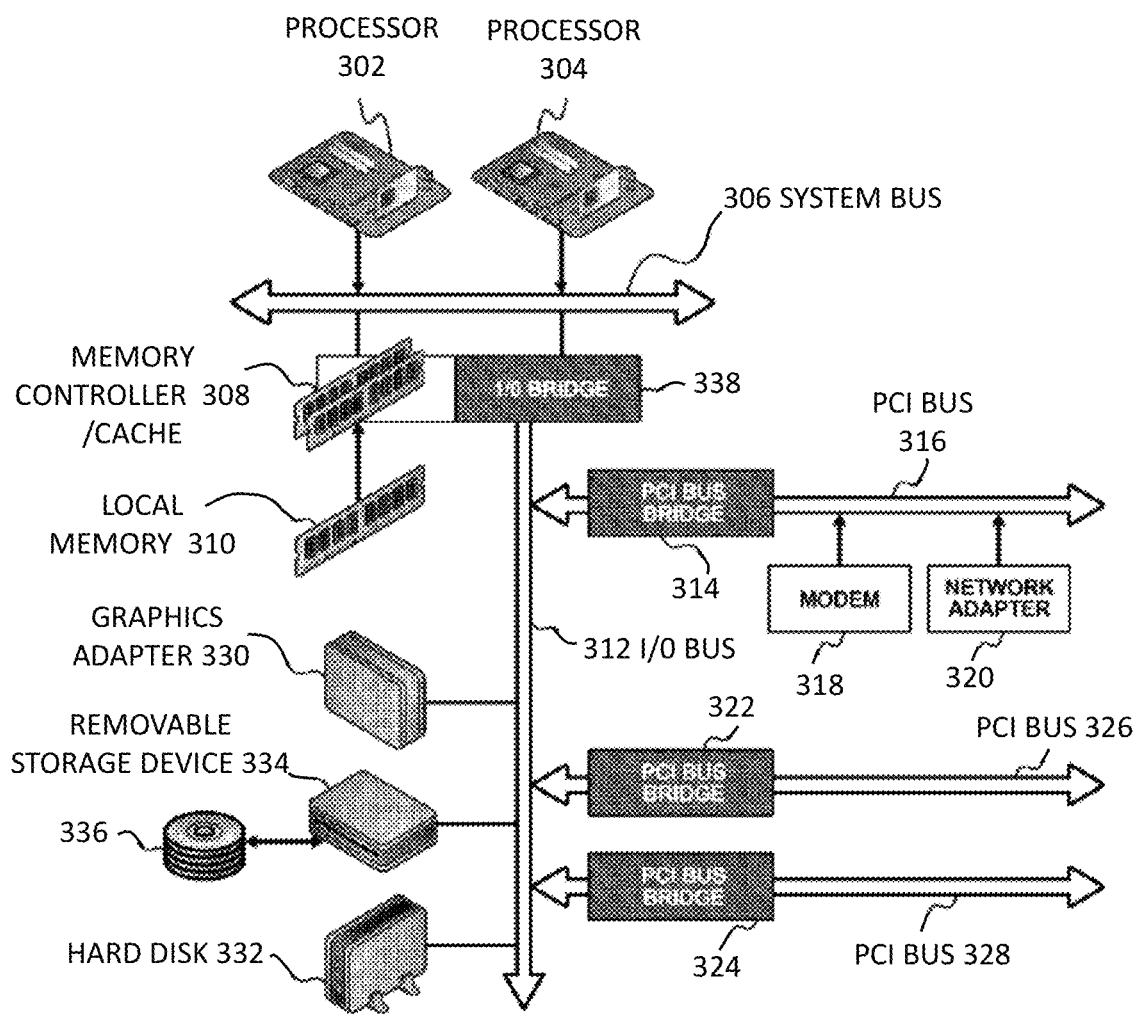
FIG. 3 is a block diagram of a data processing system, in accordance with the present invention.

Referring to FIG. 3, a block diagram of a data processing system 300 that may be implemented as a server, such as the personal computer, or implemented as a mobile electronic computing device, recording device, or other computing device coupled to a network 112 (e.g., the Internet), as shown in FIG. 1, in accordance with one embodiment of the present invention. The data processing system 300 may be a symmetric multiprocessor (SMP) system including a plurality of processors 302 and 304 connected to system bus 306. Alternatively, a single processor system may be employed. Also, connected to system bus 306 is memory controller/cache 308, which provides an interface to local memory 310. An I/O bus bridge 338 is connected to system bus 306 and provides an interface to I/O bus 312. The memory controller/cache 308 and I/O bus bridge 338 may be integrated as depicted. The processor 302 or 304 in conjunction with memory controller 308 controls what data is stored in memory 310. The processor 302 and/or 304 and memory controller 308 can serve as a data counter for counting the rate of data flow to the memory 310 or from the memory 310 and can also count the total volume of data accessed to or from the memory 310. The processor 302 or 304 can also work in conjunction with any other memory device or storage location for the databased housing user account information and data.

Peripheral component interconnect (PCI) bus bridge 314 connected to I/O bus 312 provides an interface to PCI local bus 316. A number of modems 318, or wireless cards, may be connected to PCI bus 316. Typical PCI bus implementations will support four PCI expansion slots or add-in connectors. PCI includes, but is not necessarily limited to, PCI-X and PCI Express components. Communications links to the network of computers in FIG. 1 may be provided through the modem 318 and network adapter 320 connected to PCI local bus 316 through add-in boards. Additional PCI bus bridges 322 and 324 provide interfaces for additional PCI buses 326 and 328, from which additional modems or network adapters may be supported. In this manner, the data processing system 300 allows connections to a multiple network of computers. A graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention. The processes explained in detail herein are implemented and/or embodied in a computer program. Computer programs (also called computer control logic) are stored in memory such as main memory 310, removable storage drive 334, removable media 336, hard disk 332, and signals. Such computer programs, when executed, enable the computer system to perform the features of the present invention as discussed herein. In particular, the computer programs, when executed, cause the processor 302 and/or 304 to perform the features of the emergency notification and communication process in the system as described herein.

In this document, the terms "computer program medium," "computer usable medium," and "computer readable medium" are used to generally refer to media such as main memory 310, removable storage drive 334, removable media 336, hard disk 332, and signals. These computer program products are means for providing software to the computer system. The computer readable medium allows the computer system to read data, instructions, messages or message packets, and other computer readable information from the computer readable medium. The computer readable medium, for example, may include non-volatile (non-transitory) memory, such as Floppy, ROM, Flash memory, Disk drive memory, CD-ROM, and other permanent storage. It is useful, for example, for transporting information, such as data and computer/programming instructions, between computer systems. Furthermore, the computer readable medium may comprise computer readable information in a transitory state medium such as a network link and/or a network interface, including a wired or wireless network, that allows a computer to read such computer readable information.

The network hardware components and system architecture for embodiments of the emergency notification and communication system have been described above. Although the figures depicted herein show a specific order of executing the process steps, the order of executing the steps may be changed relative to the order shown in certain embodiments. Also, two or more steps described as occurring in succession may be executed concurrently or with partial concurrence in some embodiments. Certain steps may also be omitted for the sake of brevity. In some embodiments, some or all of the process steps described herein can be combined into a single process step.

As part of the administrator user account initiation or registration process, the administrator user will create a "channel," or dedicated Internet URL subdomain that is also generated in a hierarchal configuration. Included in this school-user account registration process is the creation of a username and a password associated with said account which may be received, by the server 102. In other words, the administrator user 104a may login to its account 116, hosted by the server 102. A log-in screen 200, shown in FIG. 2, may display user-input fields 204a-n for inputting the username and/or password information. Alternatively, if the administrator user 104a has not yet created an account, the administrator user 104a may first click on the "create an account" button to create its account and interact with its account by, for example, providing various inputs such as profile information and other information to be associated with the account.

As used herein, the channel created by each administrator user 104a-n is associated with and managed through such administrator-user's account 116. Further, the administrator user 104a may edit the user-interface of the sub-domain/channel information associated with its account. The teacher users 106a-n and student users 108a-n are diminutive with respect to the administrator user 104a-n in that that these users are intended to be end-users of the school-user account, and may be only permitted to be viewers, members of the school-user's channel, but are not provided with editing rights and/or other channel control privileges that are reserved for the school-user account. User accounts are hosted by the server 102 allow users to create as well as join other user channels. In other embodiments, other diminutive or superior users may be created, e.g., in the following order, super intendants of school district users, administrator users, teacher users, student users, and parent users.

Once logged into his/her user account, the users may be directed to a main or home page 400. For example, the home page 400 or user interface of an administrator user 104a may be seen in FIG. 4, wherein the administrator user 104a may interact with the server 102. In some embodiments, the administrator user 104a may include, without limitation, a school administrator, a principle, and a vice-principle.

It should be understood that although the singular term "server" is used herein for the sake of brevity, storage may occur at a database (or multiple databases) associated with the server and/or may be stored across more than one server. It should also be understood that even where the singular term "server" is used, processing steps may in some embodiments be distributed across more than one server. In one embodiment, the home page 400 may include a side bar 402 from which various options may be selected.

Figure 4:
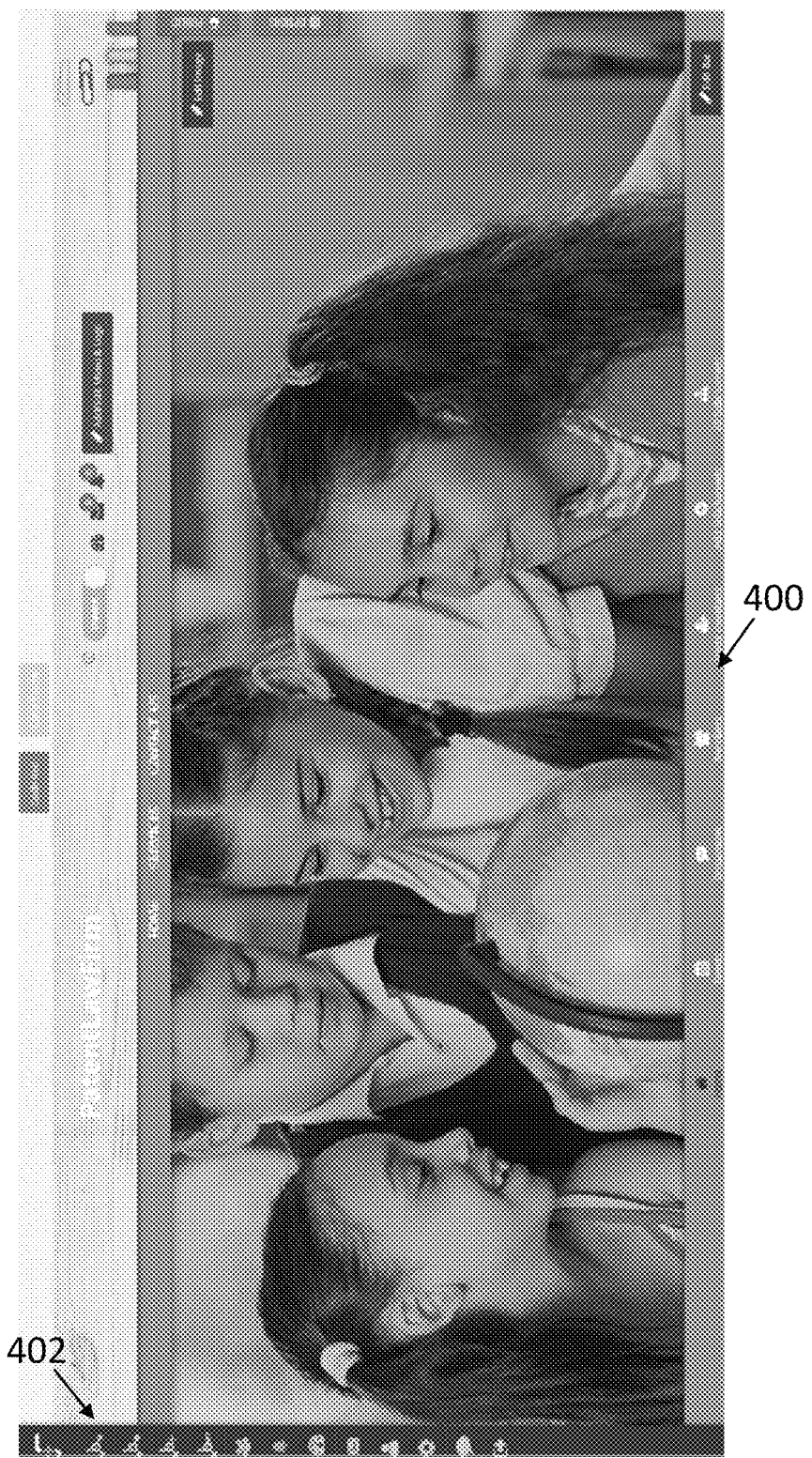
FIG. 4 is a home page or user interface of an administrator user, in accordance with the present invention.
Figure 5:
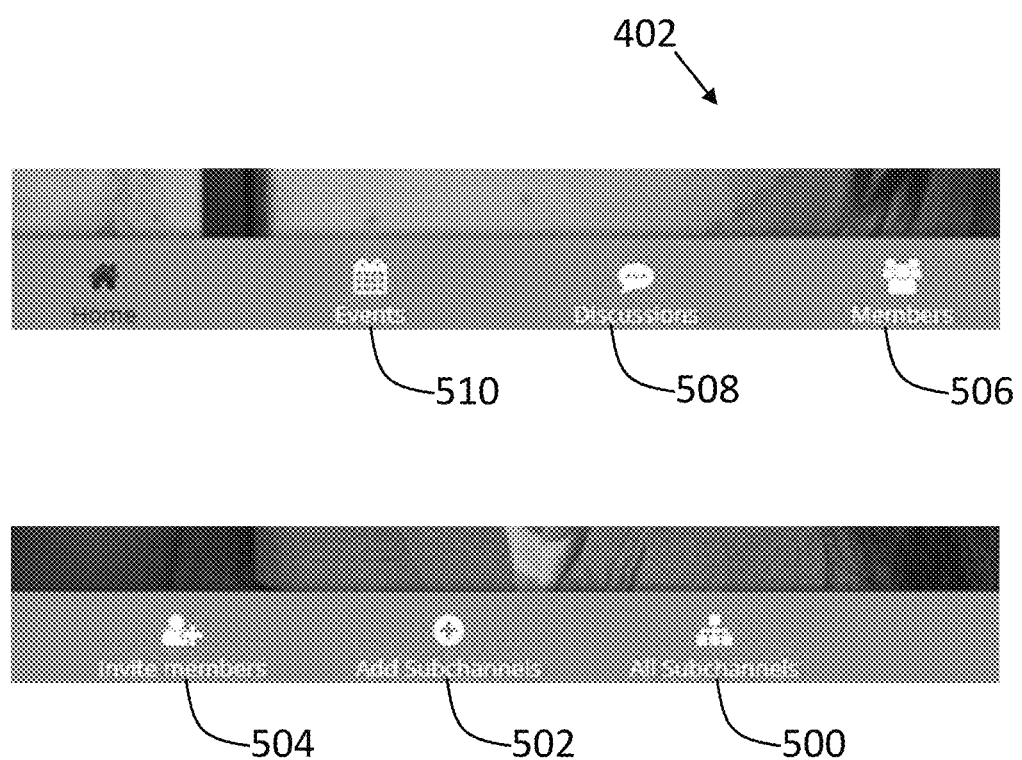
FIG. 5 is a close-up view of a bottom bar from the home page, showing the different icons, in accordance with the present invention.

With reference to FIG. 5, which is a close-up view of a bottom bar in FIG. 4, the bar 402 may include, for example, icons which, responsive to a user-selection of the icon, may allow the administrator user 104a to view all channels 500, create a new subchannel 502, show my channels, invite friends/teachers 504, find friends/teachers 506, view channel notifications, select a current channel, view member chats, edit profile information, join discussions 508, view events 510, and the like. Continuing with bottom bar 402, the administrator user may select an option to create a new sub channel 502 that will associate the one or more teacher user accounts 122 of one or more teacher users 106a-n that will be logically and selectively hierarchically diminutively associated with the first administrator user account 116.

Figure 6:
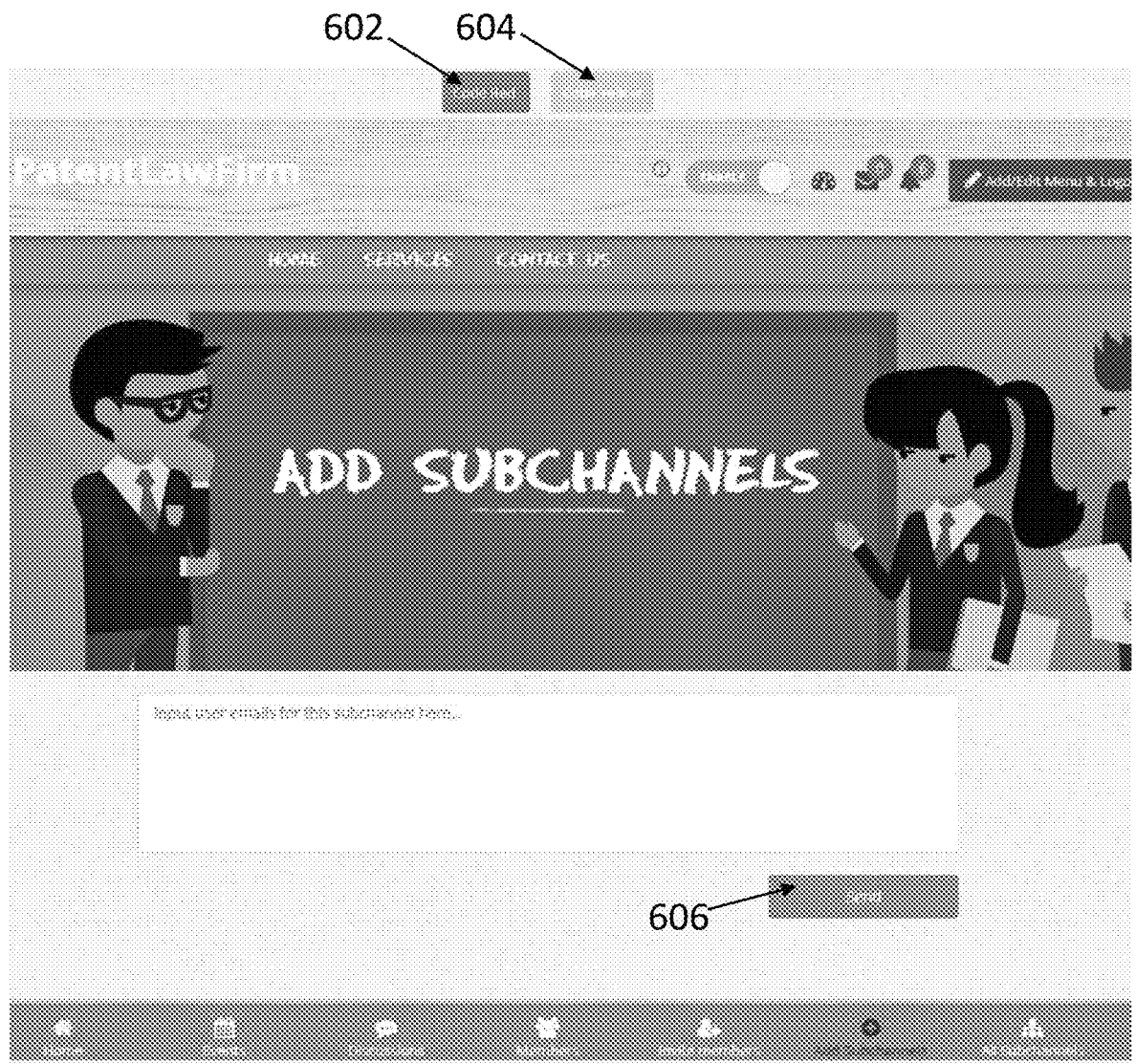
FIG. 6 is an exemplary user interface showing selection of the add subchannel icon, in accordance with the present invention.

When selecting the add subchannel icon 502, a user interface 600 as shown in FIG. 6 will be presented to the school for insertion of one or more teacher user account emails that will be associated with the user account when the invitation is accepted, and the teacher users register (as shown in FIG. 2). The subchannel or channel creating process can be described as a modifiable HTML web page that is independently dedicated to a particular user's account.

In one embodiment, the user account interfaces, templating methods, and modification/editing methods, as discussed in U.S. Pat. No. 9,910,682, which is incorporated herein by reference, may be employed.

Still referring to FIG. 6, the user interface 600 of an administrator user 104a may include a "Code Red" icon 602 and a "Code Yellow" icon 604. The "Code Red" and/or the "Code Yellow" icon associated with an emergency event, e.g., a stabbing or fire, when initiated by the administrator user, may send out an emergency alert 606 of the same, via SMS, email, or other communication means, to one or more selectable teacher user(s) and/or student user(s) over a wide-scale basis, i.e., emailing the group of diminutively associated users. Said another way, the administrator user account/channel may be operably configured to automatically send an emergency alert 606 of the Code Red 602 or Code Yellow 604 to each of the plurality of teacher user(s) or student user(s) as a result of the selection of the same.

Figure 7:
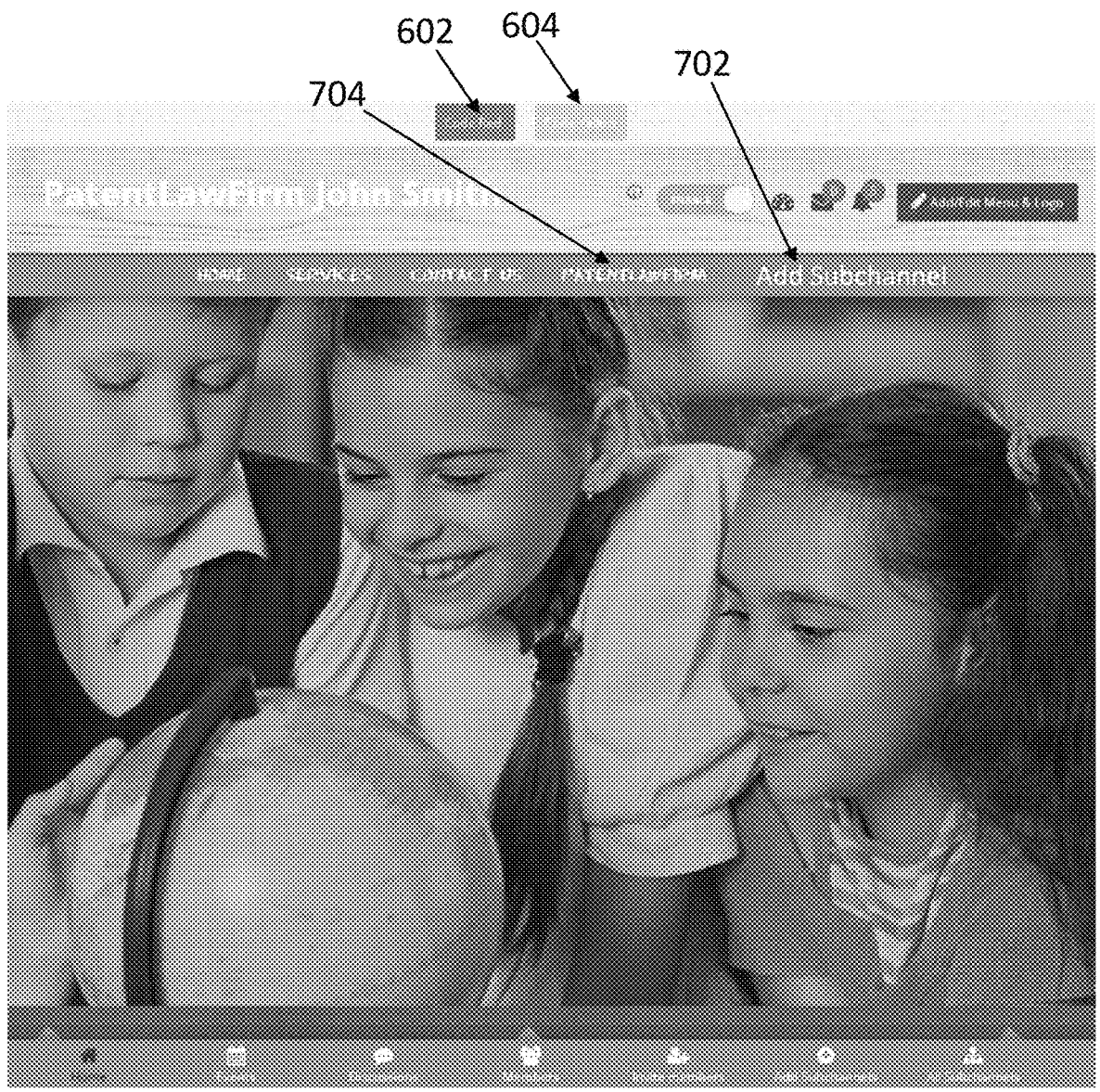
FIG. 7 is an exemplary teacher user interface displaying Code Red and Code Yellow icons, in accordance with the present invention.

In other embodiments, as shown in FIG. 7, the same Code Red 602 and/or Code Yellow 604 icons are present on a teacher user interface 700 for the administrator user interface. In one embodiment, the at least one server 102 may receive a first emergency notification (as a result of the user selection a Code Red or Code Yellow) for an emergency event, e.g., shooting, from the first teacher user. Upon receipt, the administrator user 104a is also notified, wherein the administrator user may approve the wire-spread or selective distribution of the emergency notification to other administrator user(s), teacher user(s), student user(s), and/or first emergency response user(s).

Additionally, a second emergency notification for the emergency event by a second teacher user may also be received by the server and/or administrator user. Further, a third emergency notification for the emergency event by a third teacher user may also be received by the server. In one embodiment, upon receipt of the third teacher emergency notification, a wide-spread or group notification is sent out to all associated and/or selectable teacher-user accounts or student-user accounts. Said another way, the server may communicate an emergency alert 606, upon receipt of the third emergency notification for the emergency event to the plurality of teacher user accounts and the plurality of student user accounts for corrective or responsive action.

In other embodiments, one or more emergency response users may also be communicatively coupled to the network. The emergency response users may include, without limitation, a medical professional, an ambulance unit, a law enforcement officer, a fireman, a hazardous material clean up unit. The response notification system of the present invention therefore may create a three-tiered notification system that is based on a hierarchal relationship.

Similar to the school-user interface, the teacher user will also associate one or more student user accounts in accordance with the present invention by clicking the "Add Subchannels" icon 702, wherein one or more email addresses will be inserted into the appropriate field for email, SMS, or other means. The "Add Subchannels" icon 702 allows the administrator user 104a-n to scale the emergency notification capacity of the system.

The teacher-user interface 700 may also include a link 704 to the administrator user web interface where postings or other information may be viewed. In some embodiments, when the student users are associated with the teacher user account, they are similarly associated with the administrator user account that is associated with the teacher user account in which the student user is registering for. Unlike the school and teacher-account interfaces, the student user web interface may not include the "Add Subchannel" link.

Figure 8:
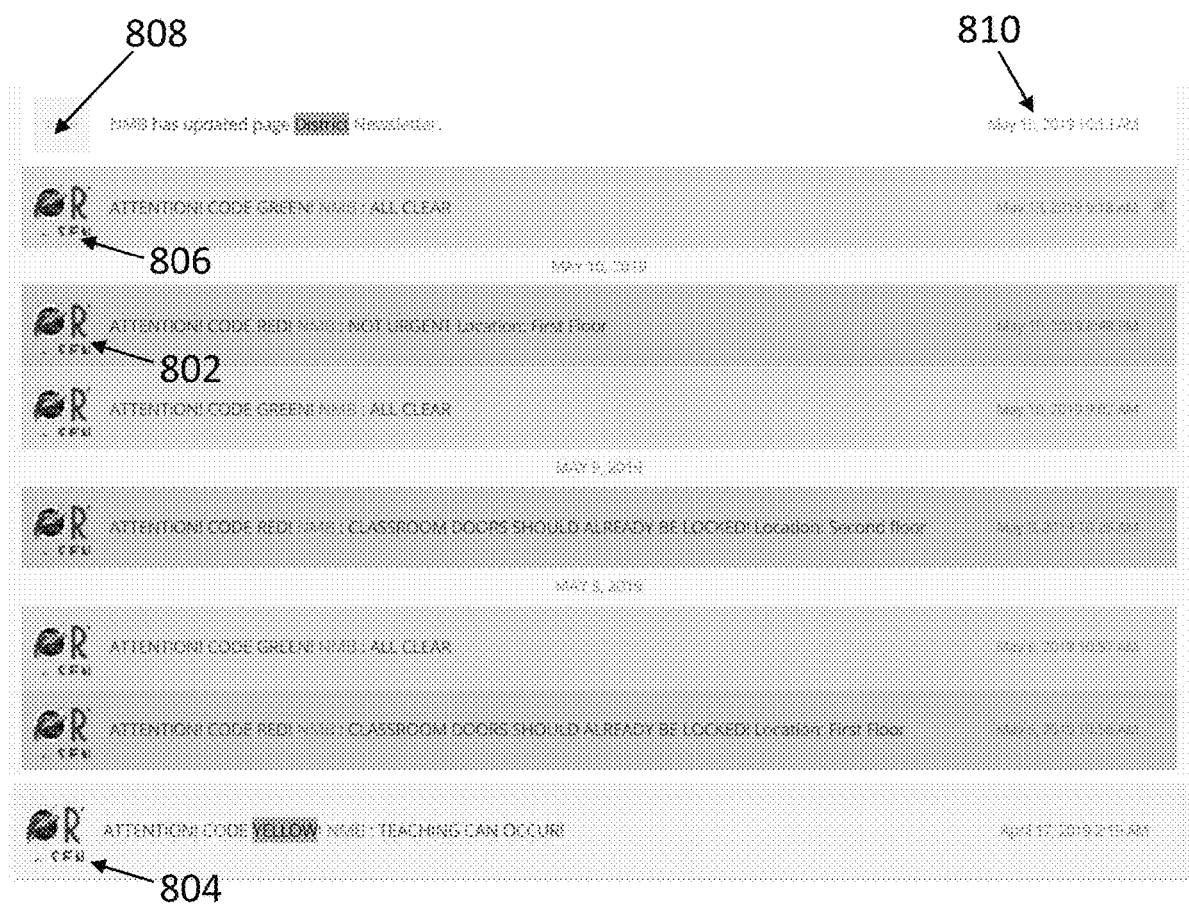
FIG. 8 is an exemplary user interface on the mobile communications devices of the first teacher and student users, in accordance with the present invention.

Turning now to FIG. 8, the mobile communications devices of the first teacher and student users have an electronic display that is operably configured to receive user inputs. The mobile communication devices download an EN mobile software application that operates the system. In one embodiment, the EN mobile software application can be mobile, so as to enable the teacher user and the student user to move freely in an emergency event. This is especially true because the GPS/MAC address is used for security purposes—and because if an attacker, for example, attacks the school, the teacher user 106a-n and student users 108a-n are generally mobile. However, in other embodiments, the EN mobile software application is operable on a stationary communication device.

The EN mobile software application is communicatively coupled to the at least one server over a selectively closed network. However, in other embodiments, the network is open. It is significant to note though, that the software application may also be downloadable on a stationary communication device, and operate substantially the same as for the mobile communication device.

As shown in FIG. 8, the system uses a color-coded emergency alert scheme to visually indicate the type and extent of emergency event to the users. In one embodiment, a code red icon 802, a code yellow icon 804, and a code green icon 806 are the color-coded indicators that relay the extent of the emergency event to the first administrator user, the first teacher user, and the first student teacher. These color-coded icons are visible to the first teacher user 106a and the first student user 108a on a mobile communications device of the first teacher user and a mobile communications device of the first student user.

In one embodiment, the code red icon 802 and the code yellow icon 804 are both inconspicuously displayed proximal to an upper portion of the user interface. In one possible embodiment, the code red icon 802 and the code yellow icon 804 display with a time stamp 810 on the first page of the user interfaces. The time stamp can be used by the first administrator user to review the emergency event and notifications that occurred.

In one embodiment, the code red icon 802 indicates that the emergency event is occurring, and thus the users should hide or escape, accordingly. For example, a message stating "Intruder", or "Fire". The code yellow icon 804 indicates that the emergency event has recently concluded—yet caution is still required. For example, a message stating the "Teaching can occur", and "Classroom doors should already be locked", which can be an indication that the emergency event might be over, but not fully certain. Finally, a code green icon 806 indicates that the emergency event is concluded, or a false alarm. For example, "All Clear" to indicate that the emergency event is verifiably over.

Since the first teacher user and the first student user are likely to be moving, i.e., running/escaping during an emergency event, the use of a mobile communication device, such as a personal smart phone, for indicting the different colored icons is optimal. However, in some embodiments, a more stationary communication device, such as a computer or laptop, may also be operable with the system and method.

Additionally, an administrative notice 808 displays a message, advice, or alert from the first administrator user 104a also displays on the mobile communication device of the first teacher user 106a and the first student user 108a. The administrative notice 808 may include a message, such as "School health inspection report has posted". The administrative notice 808 can provide emergency related, or training information for the users.

Figure 9:
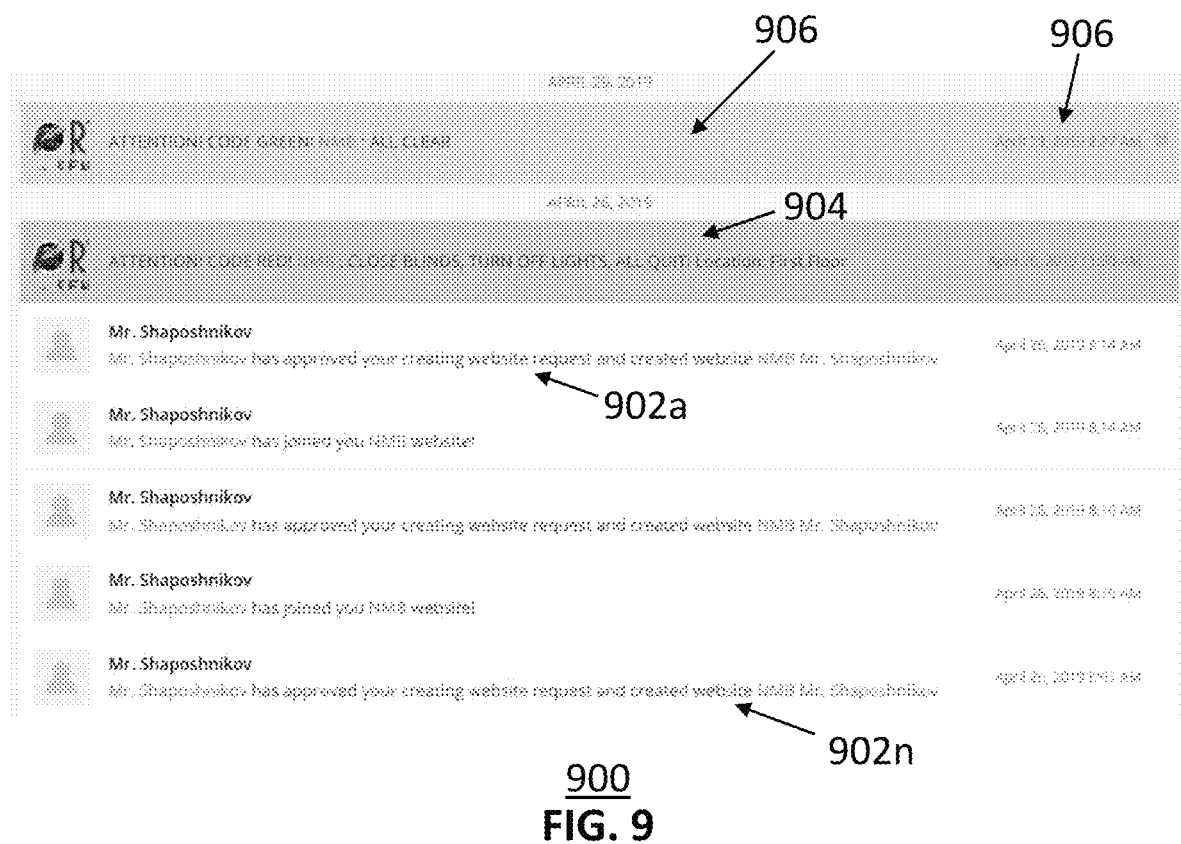
FIG. 9 is a display on the user mobile communication devices showing administrative notices that the first administrator user can provide, in accordance with the present invention.

FIG. 9 illustrates additional examples of administrative notices 902a-n that the first administrator user 104a can provide on the user interface 900 displayed on the user mobile communication devices. In one embodiment, the name of the administrator user, and the time of the post display next to the administrative notices 902a-n. The administrative notices 902a-n examples in FIG. 9 reference school-related, or emergency preparation-related information that displays on the user interface of the mobile communication device, e.g., a code red alert notification 904, and who issued it, with directives on how the users should proceed. The UI may also include notification(s), e.g., notification 906, conveying when the school is safe, or "code green," and who issued the "code greed." Such administrative notices 902a-n, while not directly commenting on the emergency event like the color-coded icons, can still be useful for updating information, and training the teacher users and student users for an emergency event. For example, "School health inspection report", and "School has updated the newsletter". In one possible embodiment, the school-related, or emergency preparation-related information display with a time stamp on the first page of the user interfaces. The time stamp 908 can be used by the first administrator user to review the emergency event and notifications that occurred.

Figure 10:
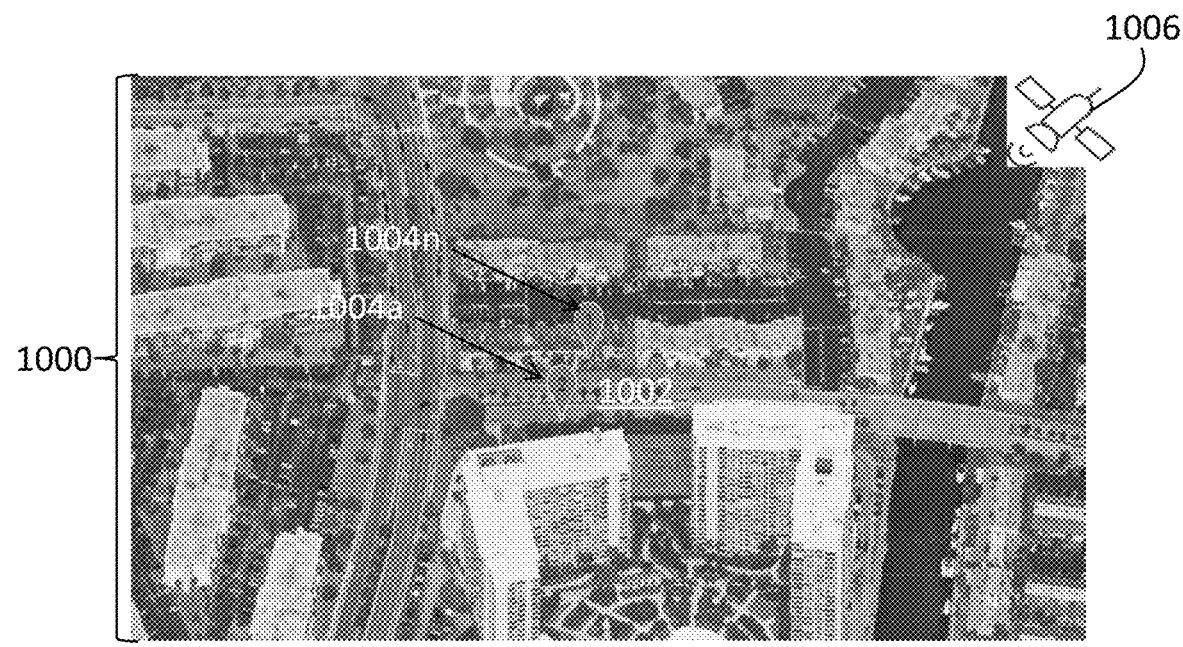
FIG. 10 is a top view of an exemplary digital map tracking the geolocation of the teacher users and student users, in accordance with the present invention.

Turning now to FIG. 10, the system provides a unique feature that graphically tracks, on a digital map 1000, a geolocation 1002, and even a specific location 1004a-n, of the first teacher user 106a, the first student user 108a, or other user activating the code red or code yellow icon. This mapping feature is efficacious for helping the emergency response user 109a to quickly locate the first teacher user 106a and the first student user 108a in real time. As discussed further herein, the activation of the code red icon, code yellow icon, or other communication icon sends out or communicates the desired communication (and/or mapped location) across the network to other users communicatively coupled thereto.

Operation of the digital map tracking requires communicatively linking the mobile communication devices of the first teacher user and the first student user with a global positioning system (GPS) 1006. The GPS 1006 is configured to track the geolocation of the mobile communication devices being held by the first teacher user and the first student user. The EN mobile software application provides software that allows the mobile communication devices to communicatively link with the GPS 1006. In one embodiment, the global positioning system, as discussed in U.S. Pat. No. 510,540, which is incorporated herein by reference, may be employed.

The GPS 1006 tracks the geolocation of the first teacher user 106a and the first student user 108a upon activation of the first emergency notification generated on the user interface of the mobile communications devices. Thus, as soon as the users indicate an emergency event is occurring, the GPS is triggered to track accordingly. As discussed above, the geolocation 1002 of the first teacher user 106a and the first student user 108a is represented on a digital map 1000 to be viewed by the emergency response user 109a. The geolocation 1002 may include a large area range, about 200 meters.

However, the system also provides a specific location 1004a-n of the users to help emergency response users 109a-n quickly find the teacher users 106a-n and the student users 108a-n. The teacher user and the student user input their specific locations 1004a-n into the user interface of the mobile communications devices, upon activating the first emergency notification to the server 102 to indicate an emergency event. The specific location of the first teacher user and the first student user visually appear on the digital map.

In one non-limiting embodiment, the specific location 1004a-n is a floor or a room of a building. For example, upon identifying an emergency event, the first student user 108a inputs a location in the $2^{nd}$ floor of library. The GPS identifies the general geolocation of the first student user 108a, and the first student user 108a or other user inputs the specific location ($2^{nd}$ floor of library).

Figure 11:
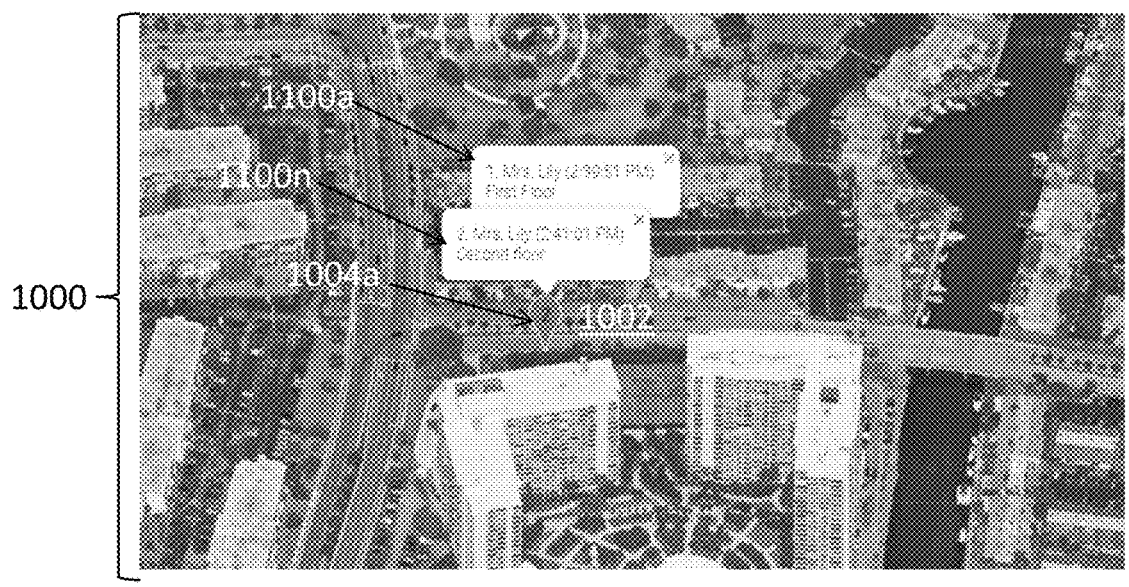
FIG. 11 is a top view of an exemplary digital map showing the specific location and geolocation of the teacher users and student users, in accordance with the present invention.

Thus, the larger area geolocation 1002 can be used by the emergency response users 109a-n to arrive at the school having the emergency event. Then, the digital map 1000 displays the specific location of the users so that the emergency response users 109a-n can enter the correct building. In an alternative embodiment shown in FIG. 11, a user identification 1100a-n appears next to the specific location. The user identification 1100a-n includes a name and time stamp to help the emergency response user to plan the rescue accordingly. Beneficially, the software application and system is operably configured to monitor and display the geolocation 1002 of the initial and subsequent emergency response users 109a-n activating the red icon, yellow icon, or other icons across the network and on the map on the user's electronic interface on their respective mobile computing devices. The above map and emergency location information also facilitates in helping first responders track where the danger is within a building structure, which is a problem many first responders are faced with. To that end, the map may also highlight or otherwise make conspicuous the last point on the map where the emergency response came from.

Figure 12:
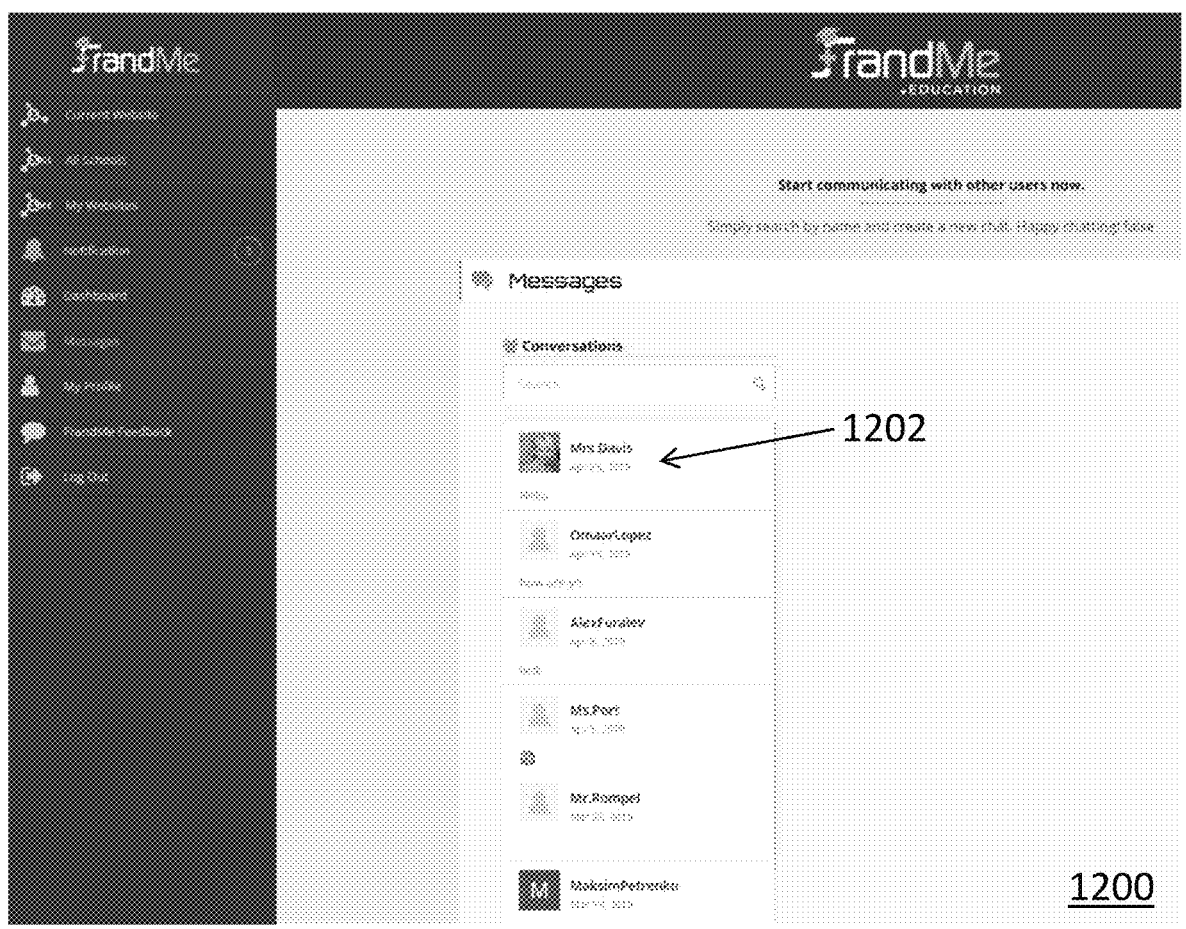
FIG. 12 is an exemplary message page used by users for messaging functions, in accordance with the present invention.

Turning now to FIG. 12, the system allows the different users to communicate with each other inside the closed network by transmitting a message 1202 before, during, and after the emergency event. This messaging function may be useful for coordinating a plan or escape or attack in relation to the emergency event. The messaging occurs on a message page 1200 on which the administrator users 104a-n, the teacher users 106a-n, and the student users 108a-n can communicate from their mobile communication devices. In alternative embodiments, the relative users 105a-n may also be involved in the messaging. The message page may be accessible upon activation of the first emergency notification generated on the user interface of the mobile communications devices. For example, a teacher user can instruct a plurality of student users to move towards an East section of the school.

Figure 13:
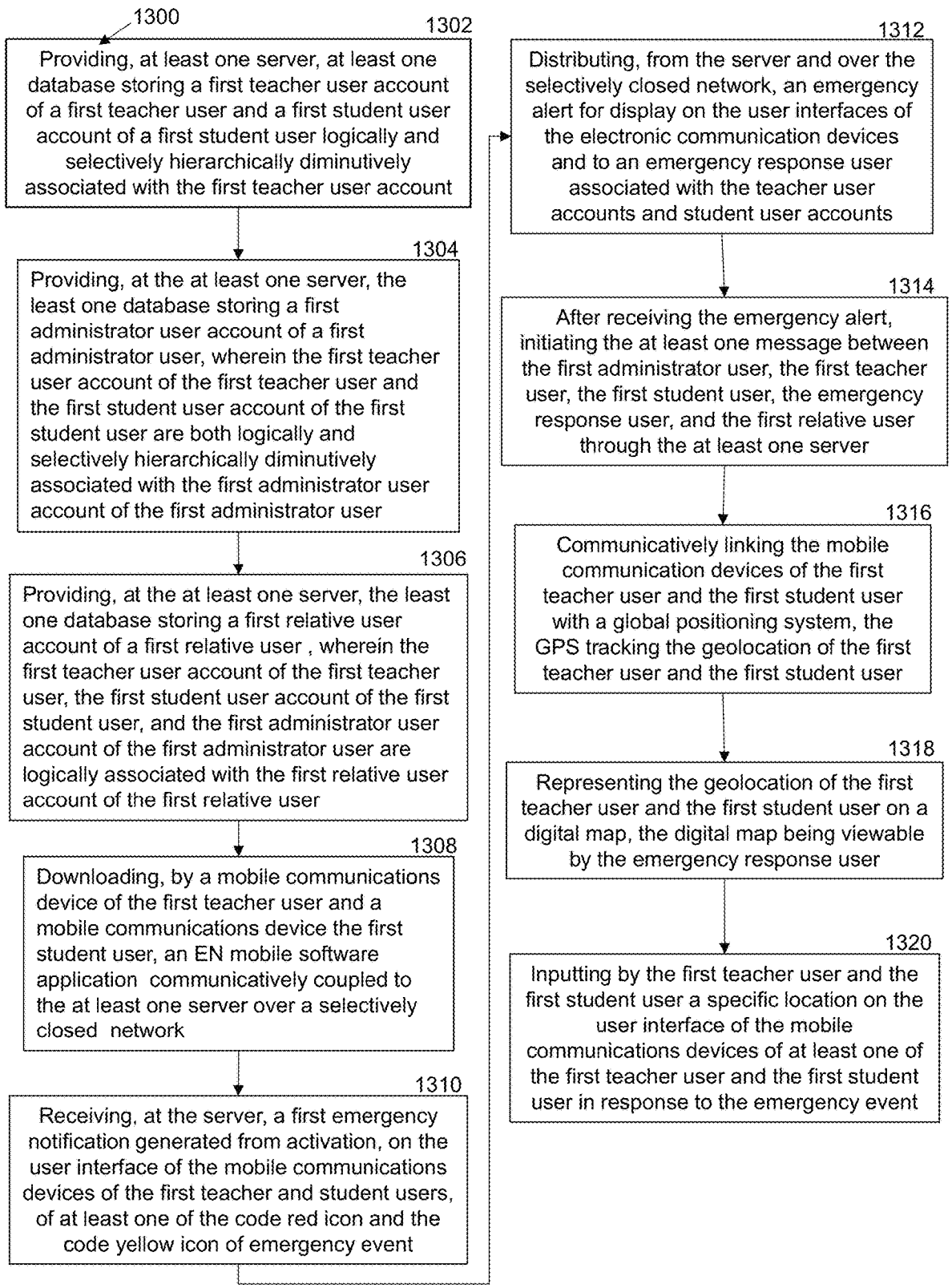
FIG. 13 is a process-flow diagram depicting an exemplary computer-implemented emergency notification (EN) method 1300 implemented in an education facility environment, in accordance with the present invention.

In operating the system, the flowchart in FIG. 13 references a computer-implemented emergency notification (EN) method 1300 implemented in an education facility environment. The method 1300 comprises an initial Step 1302 of providing, at least one server, at least one database storing a first teacher user account of a first teacher user and a first student user account of a first student user logically and selectively hierarchically diminutively associated with the first teacher user account, wherein the first teacher user account is part of a plurality of teacher user accounts resident on the at least one database and the first student user account is part of a plurality of student user accounts resident on the at least one database that are operably configured to be selectively hierarchically diminutively associated with the first teacher user account.

In some embodiments, the server 102 may include a central and remote server that provides functionality for other programs, including clients. The architecture for the server may be a client-server model, and a single overall computation is distributed across multiple processes or devices. The server is an important component for coordinating communications and information during the emergency event. By utilizing a central server in this manner, an administrator user or a law enforcement user my better coordinate and understand the situation on the ground.

The method 1300 may further comprise a Step 1304 of providing, at the at least one server, the least one database storing a first administrator user account of a first administrator user, wherein the first teacher user account of the first teacher user and the first student user account of the first student user are both logically and selectively hierarchically diminutively associated with the first administrator user account of the first administrator user, whereby the plurality of teacher user accounts and the plurality of student user accounts are operably configured to be selectively hierarchically diminutively associated with the first administrator user account.

The database 114 stores the data and is in communication with the server 102. The user accounts may include information about the account holder. For example, a teacher user account 122 comprises a name, an e-mail address, a telephone number, a workspace area, a list of family members, and prior military or fighting training. The administrator user 104a may more effectively view and coordinate responses to the emergency event by understanding the teacher users 106a-n and their background and work area.

A Step 1306 includes providing, at the at least one server, the least one database storing a first relative user account of a first relative user, wherein the first teacher user account of the first teacher user, the first student user account of the first student user, and the first administrator user account of the first administrator user are logically associated with the first relative user account of the first relative user. The relative user may include a parent, brother, sister, uncle, grandparent, or legal guardian of the student users 108a-n, or even the teacher users 106a-n. By incorporating relatives into the system, communication is enhanced, and emergency response users 109a-n are less hindered with questions and requests by relatives during the emergency event.

In some embodiments, a Step 1308 comprises downloading, by a mobile communications device of the first teacher user and a mobile communications device the first student user, an EN mobile software application communicatively coupled to the at least one server over a selectively closed network, the mobile communications devices of the first teacher and student users having an electronic display operably configured to receive user inputs and the EN software application operably configured to cause a user interface to display on the electronic display of the mobile communications devices of the first teacher and student users with a code red icon, a code yellow icon, and a code green icon display on the user interfaces. The EN mobile software application comprises a computer program that runs on the mobile communication devices of the users. The EN mobile software application is operable to enable viewing and functionality with the pages shown in FIG. 2 and FIGS. 4-9. For example, a home page 200, an administrator page, a message page, and the like.

A Step 1310 includes receiving, at the at least one server, a first emergency notification generated from activation, on the user interface of the mobile communications devices of at least one of the first teacher user and the first student user, of at least one of the code red icon and the code yellow icon of an emergency event. When an emergency event is detected, the teacher users and/or the student users, through their mobile communication devices, transmit the first emergency notification to the server.

In some embodiments, a Step 1312 may include distributing, from the at least one server and over the selectively closed network, an emergency alert for display on the user interfaces of the electronic communication devices and to an emergency response user associated with the plurality of teacher user accounts and the plurality of student user accounts. The server then processes the information from the first emergency notification and automatically replies with an emergency alert, comprising the code red icon and/or the code yellow icon. Further, a code green icon is also possible through the server or the administrator user to relay emergency-related or training information.

A Step 1314 comprises after receiving the emergency alert, initiating the at least one message between the first administrator user, the first teacher user, the first student user, the emergency response user, and the first relative user through the at least one server. The users can message each other in real time through the closed network. This messaging function may be useful for coordinating a plan or escape or attack in relation to the emergency event. The messaging occurs on a message page 1200 on which the administrator users 104*a-n*, the teacher users 106*a-n*, and the student users 108*a-n* can communicate from their mobile communication devices.

The method 1300 may further comprise a Step 1316 of communicatively linking the mobile communication devices of the first teacher user and the first student user with a global positioning system, the global positioning system tracking the geolocation of the first teacher user and the first student user. The GPS is a satellite navigation system used to determine the ground position of the mobile communication devices for the teacher user and the student users. This tracking feature is useful for the emergency response users 109*a-n* to rescue the users in the school. Thus, the emergency response users 109*a-n* are communicatively linked with the server during the emergency event; and may also be in communication with the administrator user to prepare an evacuation plan.

A Step 1318 includes representing the geolocation of the first teacher user and the first student user on a digital map, the digital map being viewable by the emergency response user. The digital map 1000 provides an eagle's view of the area around the school. The emergency response users utilize the graphical cue to locate the position of the teacher and student users during the event. The digital map may also indicate roads, hazards, construction around the school, weather, and pother parameters useful for planning an evacuation, attack, response, and the like.

A final Step 1320 includes inputting by the first teacher user and the first student user a specific location on the user interface of the mobile communications devices of at least one of the first teacher user and the first student user in response to the emergency event. To enhance the effect of the GPS, the teacher and student users may input a specific location. For example, indicating to be on a fifth floor of a science building in the school. The emergency response users view the geolocation of the user in or around the science building, and also read the text of the specific location to further hone ion on the location of the users.

In conclusion, a web-based school emergency notification system and method allows a first teacher user, a first student user, a first administrator user, a first relative user, and an emergency response user to effectively communicate in real time during an emergency event. The system and method are operable on a mobile communication device carried by each user, and through a downloadable EN mobile software application. The software application is communicatively coupled to at least one server over a selectively closed network, allowing the users to send messages in real time. The software application communicatively links the mobile communication devices to a global positioning system. The global positioning system tracks the geolocation of the teacher user and student user at the school. The users can also input a specific location for tracking with the GPS. The users can also message each other in real time during the emergency event to coordinate a response.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A computer-implemented emergency notification (EN) method implemented in an education facility environment comprising the steps of:

providing, at least one server, at least one database storing a first teacher user account of a first teacher user and a first student user account of a first student user logically and selectively hierarchically diminutively associated with the first teacher user account, wherein the first teacher user account is part of a plurality of teacher user accounts resident on the at least one database and the first student user account is part of a plurality of student user accounts resident on the at least one database that are operably configured to be selectively hierarchically diminutively associated with the first teacher user account;

downloading, by a mobile communications device of the first teacher user and a mobile communications device the first student user, an EN mobile software application communicatively coupled to the at least one server over a selectively closed network, the mobile communications devices of the first teacher and student users having an electronic display operably configured to receive user inputs and the EN software application operably configured to cause a user interface to display on the electronic display of the mobile communications devices of the first teacher and student users with a code red icon and a code yellow icon both display on the user interfaces;

communicatively linking the mobile communication devices of the first teacher user and the first student user with a global positioning system;

receiving, at the at least one server, a first emergency notification generated from activation, on the user interface of the mobile communications devices of at least one of the first teacher user and the first student user, of at least one of the code red icon and the code yellow icon of an emergency event, the global positioning system tracking the geolocation generated from the at least one of the first teacher user and the first student user upon activating the first emergency notification;

distributing, from the at least one server and over the selectively closed network, an emergency alert for display on the user interfaces of the electronic communication devices of the teacher users associated with the plurality of teacher user accounts, student users associated with the plurality of student user accounts, and to an emergency response user associated with the plurality of teacher user accounts and the plurality of student user accounts; and representing the geolocation generated from the at least one of the first teacher user and the first student user upon activating the first emergency notification on a digital map, with the digital map being viewable by the emergency response user.

2. The computer-implemented emergency notification (EN) method implemented in an education facility environment according to claim 1, further comprising:

after receiving the first emergency notification, autonomously initiating a communication protocol with the emergency response user, the communication protocol including relaying indication of the emergency event to the emergency response user.

3. The computer-implemented emergency notification (EN) method implemented in an education facility environment according to claim 2, wherein:

the emergency response user includes at least one of the following: a medical professional, an ambulance unit, a law enforcement officer, a fireman, a hazardous material clean-up unit.

4. The computer-implemented emergency notification (EN) method implemented in an education facility environment according to claim 1, further comprising:

providing, at the at least one server, the least one database storing a first administrator user account of a first administrator user, wherein the first teacher user account of the first teacher user and the first student user account of the first student user are both logically and selectively hierarchically diminutively associated with the first administrator user account of the first administrator user.

5. The computer-implemented emergency notification (EN) method implemented in an education facility environment according to claim 4, wherein:

the plurality of teacher user accounts and the plurality of student user accounts are operably configured to be selectively hierarchically diminutively associated with the first administrator user account.

6. The computer-implemented emergency notification (EN) method implemented in an education facility environment according to claim 5, wherein:

the first administrator user is a school administrator, a principle, and a vice principle.

7. The computer-implemented emergency notification (EN) method implemented in an education facility environment according to claim 6, further comprising:

providing, at the at least one server, the least one database storing a first relative user account of a first relative user, wherein the first teacher user account of the first teacher user, the first student user account of the first student user, and the first administrator user account of the first administrator user are logically associated with the first relative user account of the first relative user.

8. The computer-implemented emergency notification (EN) method implemented in an education facility environment according to claim 7, further comprising:

after receiving the emergency alert, initiating at least one message between the users.

9. The computer-implemented emergency notification (EN) method implemented in an education facility environment according to claim 8, further comprising:

after receiving the emergency alert, initiating the at least one message between the first administrator user, the first teacher user, the first student user, the emergency response user, and the first relative user through the at least one server.

10. The computer-implemented emergency notification (EN) method implemented in an education facility environment according to claim 9, wherein:

The first relative user includes at least one of the following: a parent, a brother, a sister, a grandparent, an uncle, and a legal guardian.

11. The computer-implemented emergency notification (EN) method implemented in an education facility environment according to claim 1, further comprising:

inputting by the first teacher user and the first student user a specific location on the user interface of the mobile communications devices of at least one of the first teacher user and the first student user in response to the emergency event.

12. The computer-implemented emergency notification (EN) method implemented in an education facility environment according to claim 11, further comprising:

representing the specific location of the first teacher user and the first student user on the digital map.

13. The computer-implemented emergency notification (EN) method implemented in an education facility environment according to claim 1, further comprising:

causing, by the EN software application, the user interface to display on the electronic display of the mobile communications devices of the first teacher and student users a code green icon.

14. The computer-implemented emergency notification (EN) method implemented in an education facility environment according to claim 13, wherein:
the code red icon, the code yellow icon, and the code green icon inconspicuously display proximal to an upper portion of a first page of the user interfaces.

15. The computer-implemented emergency notification (EN) method implemented in an education facility environment according to claim 14, wherein:
the code red icon, the code yellow icon, and the code green icon display with a time stamp on the first page of the user interfaces.

16. A computer-implemented emergency notification (EN) method implemented in an education facility environment comprising the steps of:
providing, at least one server, at least one database storing a first teacher user account of a first teacher user and a first student user account of a first student user logically and selectively hierarchically diminutively associated with the first teacher user account, wherein the first teacher user account is part of a plurality of teacher user accounts resident on the at least one database and the first student user account is part of a plurality of student user accounts resident on the at least one database that are operably configured to be selectively hierarchically diminutively associated with the first teacher user account;
providing, at the at least one server, the least one database storing a first administrator user account of a first administrator user, wherein the first teacher user account of the first teacher user and the first student user account of the first student user are both logically and selectively hierarchically diminutively associated with the first administrator user account of the first administrator user, whereby the plurality of teacher user accounts and the plurality of student user accounts are operably configured to be selectively hierarchically diminutively associated with the first administrator user account;
providing, at the at least one server, the least one database storing a first relative user account of a first relative user, wherein the first teacher user account of the first teacher user, the first student user account of the first student user, and the first administrator user account of the first administrator user are logically associated with the first relative user account of the first relative user;
downloading, by a mobile communications device of the first teacher user and a mobile communications device the first student user, an EN mobile software application communicatively coupled to the at least one server over a selectively closed network, the mobile communications devices of the first teacher and student users having an electronic display operably configured to receive user inputs and the EN software application operably configured to cause a user interface to display on the electronic display of the mobile communications devices of the first teacher and student users with a code red icon, a code yellow icon, and a code green icon display on the user interfaces;
receiving, at the at least one server, a first emergency notification generated from activation, on the user interface of the mobile communications devices of at least one of the first teacher user and the first student user, of at least one of the code red icon and the code yellow icon of an emergency event;
distributing, from the at least one server and over the selectively closed network, an emergency alert for display on the user interfaces of the electronic communication devices of the teacher users associated with the plurality of teacher user accounts, student users associated with the plurality of student user accounts, and to an emergency response user associated with the plurality of teacher user accounts and the plurality of student user accounts;
after receiving the emergency alert, initiating the at least one message between the first administrator user, the first teacher user, the first student user, the emergency response user, and the first relative user through the at least one server;
communicatively linking the mobile communication devices of the first teacher user and the first student user with a global positioning system, the global positioning system tracking the geolocation generated from one of the first teacher user and the first student user upon activating the first emergency notification;
distributing, from the at least one server and over the selectively closed network, an emergency alert for display on the user interfaces of the electronic communication devices of the teacher users associated with the plurality of teacher user accounts, student users associated with the plurality of student user accounts, and to an emergency response user associated with the plurality of teacher user accounts and the plurality of student user accounts;
representing the geolocation of the first teacher user and the first student user upon activating the first emergency notification on a digital map, the digital map being viewable by the emergency response user; and
inputting by the first teacher user and the first student user a specific location on the user interface of the mobile communications devices of at least one of the first teacher user and the first student user in response to the emergency event.

17. A computer-implemented emergency notification (EN) system implemented in an education facility environment comprising:
at least one server;
at least one database storing a first teacher user account of a first teacher user and a first student user account of a first student user logically and selectively hierarchically diminutively associated with the first teacher user account, wherein the first teacher user account is part of a plurality of teacher user accounts resident on the at least one database and the first student user account is part of a plurality of student user accounts resident on the at least one database that are operably configured to be selectively hierarchically diminutively associated with the first teacher user account;
a first administrator user account of a first administrator user, wherein the first teacher user account of the first teacher user and the first student user account of the first student user are both logically and selectively hierarchically diminutively associated with the first administrator user account of the first administrator user, whereby the plurality of teacher user accounts and the plurality of student user accounts are operably configured to be selectively hierarchically diminutively associated with the first administrator user account;
a first relative user account of a first relative user, wherein the first teacher user account of the first teacher user, the first student user account of the first student user, and the first administrator user account of the first administrator user are logically associated with the first relative user account of the first relative user;

a mobile communications device of the first teacher user downloading an EN mobile software application, the software application being communicatively coupled to the at least one server over a selectively closed network;

an electronic display, of the mobile communications devices of the first teacher and student users, being operably configured to receive user inputs and the EN software application;

a code red icon, a code yellow icon, and a code green icon display on a user interface of the electronic display of the mobile communications devices of the first teacher and student users, the color-coded icons indicating the extent of an emergency event;

a first emergency notification generated from activation, on the user interface of the mobile communications devices of at least one of the first teacher user and the first student user, of at least one of the code red icon and the code yellow icon of an emergency event;

an emergency alert for display on the user interfaces of the electronic communication devices and to an emergency response user associated with the plurality of teacher user accounts and the plurality of student user accounts;

at least one message initiated between the first administrator user, the first teacher user, the first student user, the emergency response user, and the first relative user through the at least one server, and visible on a message page of the user interface;

a global positioning system communicatively linking the mobile communication devices of the first teacher user and the first student user, the global positioning system tracking the geolocation of the first teacher user and the first student user on a digital map, the global positioning system operably configured to track the geolocation generated from the at least one of the first teacher user and the first student user upon activation of the first emergency notification; and a specific location of the first teacher user and the first student user in response to the emergency event, the specific locating being inputted by the first teacher user and the first student user on the user interface of the mobile communications devices the server operably configured to:

distribute the emergency alert for display on the user interfaces of the electronic communication devices of the teacher users associated with the plurality of teacher user accounts, student users associated with the plurality of student user accounts, and to an emergency response user associated with the plurality of teacher user accounts and the plurality of student user accounts; and represent the geolocation generated from the at least one of the first teacher user and the first student user upon activating the first emergency notification on a digital map, with the digital map being viewable by the emergency response user.

* * * * *